June 2, 1925.

R. S. SQUIRE

TOOL

Original Filed April 7, 1923

1,540,373

INVENTOR
Raymond S. Squire
BY
Duell, Warfield & Duell
ATTORNEY

Patented June 2, 1925.

1,540,373

UNITED STATES PATENT OFFICE.

RAYMOND S. SQUIRE, OF MILLERS FALLS, MASSACHUSETTS, ASSIGNOR TO MILLERS FALLS COMPANY, OF MILLERS FALLS, MASSACHUSETTS, A CORPORATION OF MASSACHUSETTS.

TOOL.

Application filed April 7, 1923, Serial No. 630,584. Renewed September 22, 1924.

*To all whom it may concern:*

Be it known that I, RAYMOND S. SQUIRE, a citizen of the United States, residing at Millers Falls, in the county of Franklin and State of Massachusetts, have invented certain new and useful Improvements in Tools, of which the following is a full, clear, and exact description, such as will enable others skilled in the art to which it appertains to make and use the same.

This invention relates to tools, and more particularly to tools, especially adapted for scraping bearings and for analogous uses.

An object of the invention is to provide an improved tool of this general type which is applicable to a wide variety of use.

A further object is to provide a device of the nature noted which may be manipulated with the greatest possible ease.

Another object is to provide a tool which has a strong and permanent construction, and which is susceptible of easy and economical manufacture.

The invention accordingly comprises the features of construction, combination of elements, and arrangement of parts, which will be exemplified in the article hereinafter described, and the scope of the application of which will be indicated in the claims.

For a complete understanding of the nature and objects of the invention reference should be had to the following detailed description and to the accompanying drawings, in which.

Figure 1:
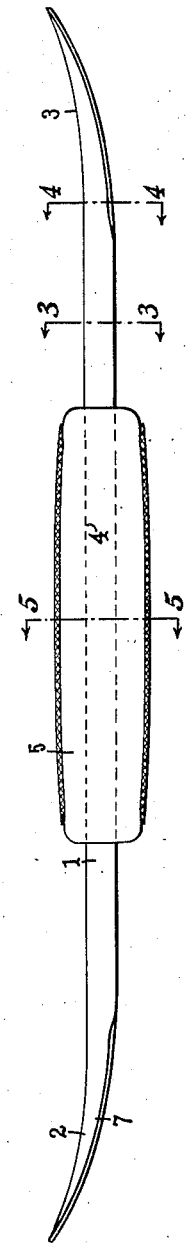
Fig. 1 is a side elevation of a scraping tool embodying the features of the invention.
Figure 2:
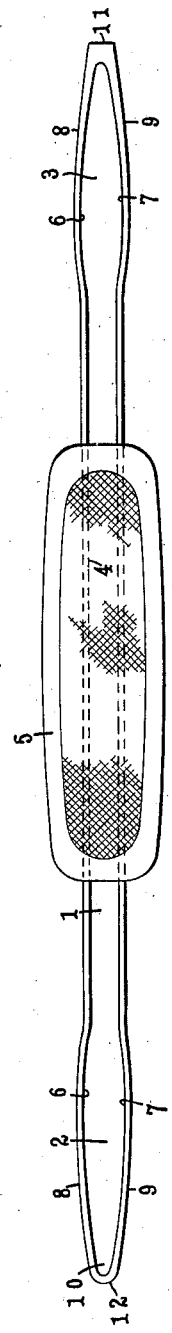
Fig. 2 is a bottom plan thereof.
Figure 5:
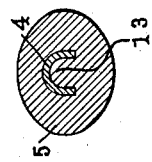
Figure 4:
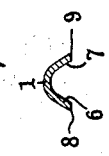
Figure 3:

Figs. 3, 4 and 5 are sections respectively on the lines 3—3, 4—4 and 5—5 of Fig. 1.

The particular embodiment of the invention shown in the drawings consists of a scraping tool comprising a blade or working member 1, the shank 4 of which has, in the present instance, a U-shaped cross-section. At either end of this shank are formed blades or working members 2 and 3, the side walls 6 and 7 of which constitute continuations of the sides of the U-shaped shank, and may be inclined outwardly, or bowed as in the tool shown. The channel between members 6 and 7 is of decreasing depth toward the ends of the tool, and, in the present instance, disappears entirely at the ends, where these members converge into tool-heads 10. On each of the bowed members 6 and 7, there are formed longitudinal scraping edges 8 and 9, respectively, which in the tool shown are symmetrically arranged, and a lateral scraping edge is formed on each of the tool-heads 10.

The scraping edges on the tool-heads preferably have a different contour, so that they may readily be used for various purposes. For example, one of these scraping edges may be squared or flattened so as to resemble a chisel, as at 11, so that it may be employed for removing paper shims or for scraping out oil grooves of bearings and the like; while the scraping edge at the other end may be rounded, as at 12, so that it may be used for purposes for which a square-tipped scraper is not readily adapted.

Now with a view to the provision of a tool which may be manipulated with facility upon grooved or irregular surfaces, and which may be held at such an angle to the work as is convenient for manual manipulation, each of the working members 2 and 3 is tapered off toward its point and is longitudinally curved, the curve of the particular tool-head illustrated being best shown in Fig. 1. It should be noted, moreover, that the particular formation of the tool permits the shank to be employed as a lever, the rounded portion thereof serving as a fulcrum therefor. It should be noted that the opposed cutting edges 8 and 9 on the present tool permit working strokes thereof in opposite directions, while the particular construction of the tool-heads with the members 6 and 7 inclined with respect to the shank enables each scraping edge to be brought into correct position with reference to the work. Furthermore, the provision of the projecting sides 6 and 7 of the blades with a channel or a clearance space therebetween, besides increasing the usefulness of the tool, also increases the facility with which the scraping edges may be reformed or sharpened. Also, as the tool wears down due to repeated sharpenings, the relative position of the cutting edges may be maintained constant and the curved and bowed conformation thereof preserved.

In order that the tool may be manipulated with the utmost ease it is provided in the present instance with a handle 5, which is centrally positioned upon the working member 1 intermediate the blades 2 and 3. This handle is preferably made of hard rubber or similar material, which may be readily pressed or moulded about the shank 4 so that it will key into the body of the shank forming a securing rib 13 to positively prevent the same from turning or otherwise moving relatively to the handle. With a view to preventing the handle from slipping or turning in the hand of the user, it may be provided with a knurled surface and may be flattened at its sides in the manner shown in the drawings.

It will be seen that a tool such as contemplated by the invention may be formed with the blade ends thereof of quite similar contour and form and extending a substantially equal distance from the handle, so that these ends will balance each other to provide a tool which may be used for purposes such as, for example, clearing channels and scraping bearings, where the utmost care is required, and where improper pressure applied to the part to be scraped will in some instances be fatal to the success of the operation. Moreover, in a tool of the nature shown, when one blade is used for scraping the opposite blade may be grasped in the hand of the user to guide and direct the tool while the handle is grasped by the other hand to apply working force.

The provision of differently-shaped cutting edges, such as 8, 9, 11 and 12, provides, moreover, a tool which is capable of being applied to a large variety of uses and of being employed in numerous ways so that it can truly be said to embody advantages which are ordinarily found only in a number of distinct tools. A tool embodying the features of this invention, therefore, can be used for various purposes and takes the place of several scraping tools of the usual type.

A tool such as shown in the drawings and described above may be manufactured with extreme ease in a variety of ways. For example, such a tool may readily be pressed from a flat strip of steel, a tool formed in this manner being, moreover, exceedingly light, the necesary strength and rigidity being given thereto by the channel formation on the shank, which is further reinforced if a handle of the type shown is formed thereon. While various kinds of steels may be used in such a tool, a tool of exceptional cutting ability is provided when tungsten steel is used. Tungsten steel is, moreover, especially adaptable for such use, inasmuch as it may be obtained commercially in the form of thin strips.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. A bearing scraper, including a shank U-shaped in cross section, the end portions of the shank being curved in a direction opposite to the direction in which the side walls thereof extend, and said walls being bowed outwardly at said end portions and presenting longitudinal scraping edges, the height of said walls decreasing toward the ends of the shank and said walls converging at the shank ends to provide terminal scraping edges merging into and forming a continuation of said longitudinal scraping edges, one of said terminal scraping edges being rounded to form with the adjacent longitudinal scraping edges a single scraping edge extending in an unbroken curve, and the other terminal scraping edge being flat to provide sharp corners on either side thereof.

2. A bearing scraper, including, in combination, a shank U-shaped in cross section, the end portions of the shank being curved in a direction opposite to the direction in which the side walls provided by said U-shape extend, said walls being bowed outwardly at said end portions to provide curved longitudinal scraping edges, said walls decreasing in height and converging toward the ends of said shank, said ends being formed with substantially transverse terminal scraping edges forming a continuation of and merging into said longitudinal scraping edges and being of different configuration, and a handle for said shank positioned medially of said ends, said handle comprising a body enveloping and in intimate contact with the surfaces of said shank and keyed into the space between the walls thereof.

3. A bearing scraper, including a shank U-shaped in cross section, the portion of the shank adjacent one of its ends being curved in a direction opposite to the direction in which the walls provided by said U-shape extend, and said walls being bowed outwardly and presenting longitudinal scraping edges at said curved portion, said walls decreasing in height toward the end of the shank and merging with the base thereof at the end of the shank, the said end being formed to present a substantially transverse terminal scraping edge, said terminal scraping edge merging into and forming a continuation of said longitudinal scraping edges.

In testimony whereof I affix my signature, in the presence of two witnesses.

RAYMOND S. SQUIRE.

Witnesses:
M. L. SMITH,
M. A. HAYS.